J. RANZ.
VARIABLE SPEED MECHANISM.
APPLICATION FILED DEC. 12, 1910.
1,020,573.
Patented Mar. 19, 1912.
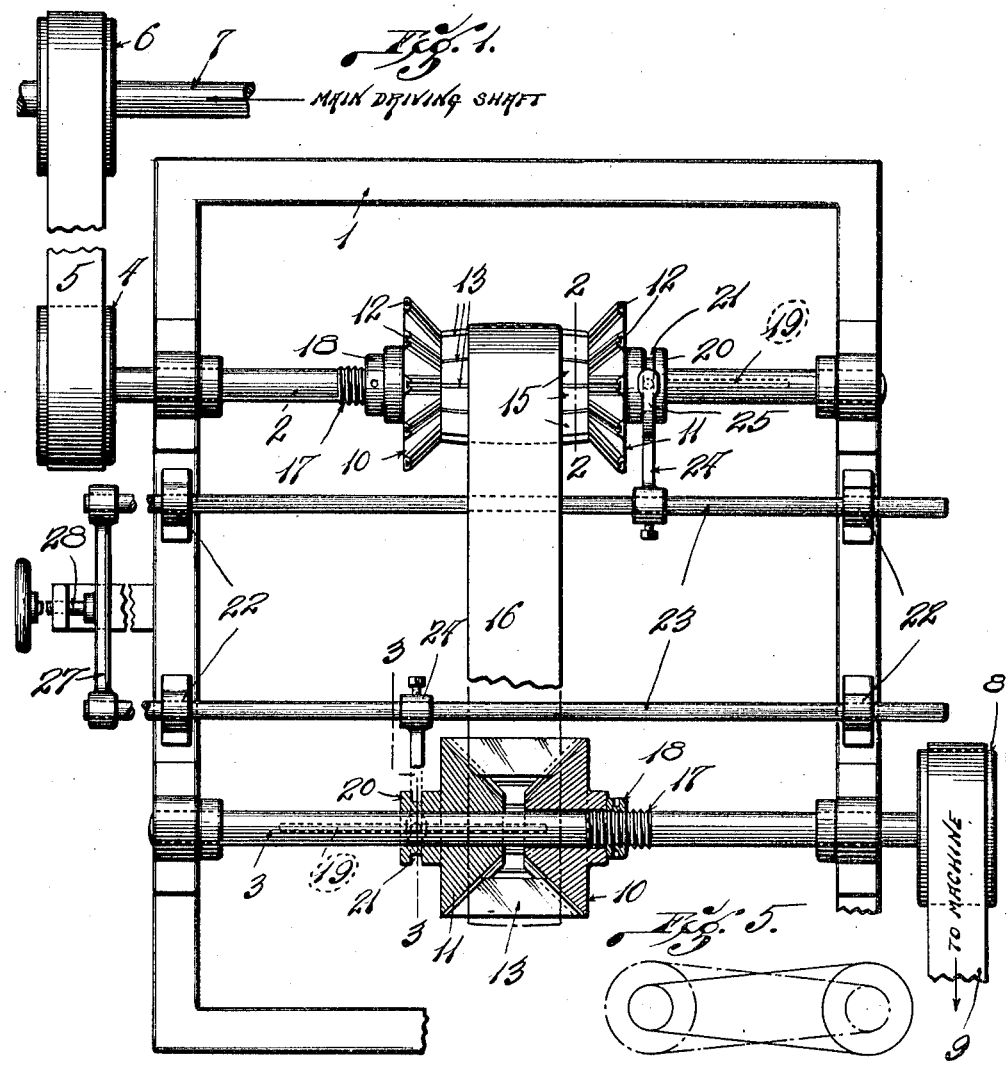
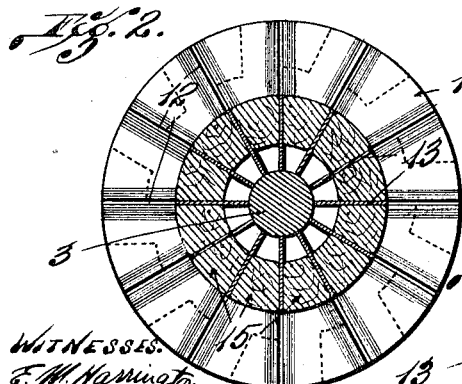
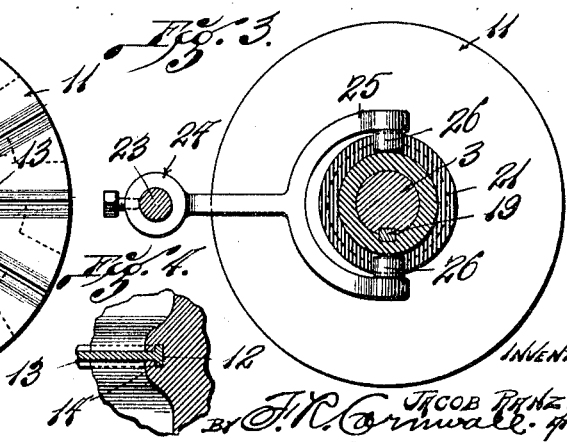

UNITED STATES PATENT OFFICE.

JACOB RANZ, OF ST. LOUIS, MISSOURI.

VARIABLE-SPEED MECHANISM.

1,020,573.  Specification of Letters Patent.  Patented Mar. 19, 1912.

Application filed December 12, 1910. Serial No. 596,953.

*To all whom it may concern:*

Be it known that I, JACOB RANZ, a citizen of the United States, residing at St. Louis, Missouri, have invented a certain new and useful Improvement in Variable-Speed Mechanism, of which the following is a full, clear, and exact description, such as will enable others skilled in the art to which it appertains to make and use the same, reference being had to the accompanying drawings, forming part of this specification, in which—

Figure 1 is a plan view of a variable speed mechanism of my improved construction, parts thereof being shown in section. Fig. 2 is an enlarged section taken on the line 2—2 of Fig. 1. Fig. 3 is an enlarged section taken on the line 3—3 of Fig. 1. Fig. 4 is an enlarged detail section illustrating the connection between two sliding members of my improved apparatus. Fig. 5 is a diagrammatic view illustrating the changes in the relative sizes of the pulleys of my improved apparatus, and the changes in the positions of the belt which operates on said pulleys.

My invention relates to an improved variable speed mechanism wherein a pair of expansible pulleys connected by a belt are utilized for converting the uniform velocity of a driving shaft into varying velocities for a driven shaft or belt.

The principal object of my invention is to construct a comparatively simple, inexpensive variable speed gearing which can be adapted for a variety of uses, which gearing utilizes a pair of expansible pulleys arranged on parallel shafts, said pulleys being provided with means adapted to receive a comparatively wide belt, thus reducing the liability of belt slippage during operation to a minimum.

Further objects of my invention are to provide simple means for readily shifting or changing the relative sizes of the expansible pulleys, and to provide simple means for independently shifting or changing the size of one of the pulleys for the purpose of tightening the belt operating on the two pulleys.

To the above purposes my invention consists in certain novel features of construction and arrangement of parts hereinafter more fully described and claimed.

Referring by numerals to the accompanying drawings 1 designates a frame of any desired size and construction, and journaled in suitable bearings on said frame is a pair of parallel shafts 2 and 3. In the application of my improved apparatus as seen in Fig. 1 I have illustrated the shaft 2 provided with a pulley 4 and operating thereon is a belt 5, which operates on a pulley 6 carried by the main driving shaft 7. The shaft 3 is provided with a pulley 8 around which passes a belt 9, which latter extends to a pulley carried by the machine or mechanism to be operated. It will be readily understood that different forms of driving mechanism, such as sprocket wheels and chains, or gearing can be utilized between the shafts 2 and 7 and between the shaft 3 and the machine or mechanism to be operated. Each of the shafts 2 and 3 carries an expanding pulley comprising a pair of oppositely disposed conical members 10 and 11, and formed in the beveled faces of these members are radially arranged grooves 12 which are T-shaped in cross section. Thin metal plates 13 extend between each pair of conical bodies and the ends of said plates are beveled to correspond with the inclination of the faces of the bodies 10 and 11, and the beveled ends of said plates are provided with laterally-projecting ribs or flanges 14, which occupy the T-shaped grooves 12. Rigidly fixed to each plate 13 is a segmental block 15 of wood, or analogous material, and the ends of all of the blocks are beveled to correspond with the inclination of the faces of the bodies 10 and 11, and the entire series of blocks between each pair of bodies 10 and 11 forms an approximately cylindrical body or pulley on which the connecting belt 16 travels. Each conical member 10 is loosely mounted upon its respective shaft, and mounted for rotation upon a threaded portion 17 of each shaft behind each conical member, are nuts 18, these nuts 18 being for the purpose of slightly shifting the conical members 10 upon their respective shafts for the purpose of tightening the belt operating between the expansible pulleys. Each conical member 11 is mounted to slide upon and rotate with the corresponding shaft by means of a key or feather 19, and formed integral with each conical member 11 is a collar 20 provided with a groove 21.

Arranged to slide transversely of the frame 1 in suitable bearings 22 thereon, is a pair of rods 23 which are parallel with each other and with the shafts 2 and 3. Mounted upon each of these rods are laterally projecting arms 24, the outer ends of which are bifurcated as designated by 25 to form yokes which encircle the collar 20. Rollers 26 are journaled upon pins seated in the ends of these yokes, and said rollers occupy the grooves 21 in said collars 20. A cross bar 27 unites the rods 23 at one end and said cross bar is provided with means preferably in the form of a screw rod 28 for imparting simultaneous sliding movement to said rods.

The expansible pulleys are identical in construction, but said pulleys occupy relatively reverse positions upon the shafts 2 and 3, i. e., the conical member 11 is positioned upon the shaft 2 in such a manner that it will move away from the conical member 10 on said shaft when the conical member 11 on the shaft 3 moves toward the conical member 10 on said last mentioned shaft. Thus the series of plates 13 and segmental bodies 15 carried thereby, which are arranged around the shaft 2, will move toward said shaft when the corresponding parts around the shaft 3 move away from said last mentioned shaft and vice versa.

While in operation the constant and uniform rotary motion of the main driving shaft 7 is transmitted by means of the belt 5 to the shaft 2 and this rotary motion is imparted to the shaft 3 at a variable speed which variable speed depends upon the relative positions of the expansible pulleys arranged upon the shafts 2 and 3, and the variable speed thus obtained is transmitted, by means of the belt 9, to the shaft machine or mechanism to be operated.

The segmental blocks 15 practically form pulleys having continuous surfaces adapted to receive a belt of such width and, therefore, the objectionable feature of belt slippage between the expansible pulleys is reduced to a minimum.

The relative sizes of the expansible pulleys can be readily changed and adjusted by manipulating the screw rod 28, which slides the rods 23 through their bearings, and which action results in imparting sliding movement to the conical members 11 and consequently expanding one of the pulleys and contracting the other.

During the expanding and contracting movement the beveled ends of the plates 13 travel through the T-shaped grooves 12, formed in the faces of the members 10 and 11, and as the member 11 draws away from the member 10 the entire series of plates between said members move toward the corresponding shaft, and when the member 11 is moved toward the member 10 the plates 13 carrying the segments 15 are moved outward in unison to enlarge the circumference of the pulley upon which the belt 16 travels.

When the shafts 2 and 3 are close together it may be found desirable to utilize only one rod 23, the same being located midway between the shafts 2 and 3, and said single rod carrying the pair of arms 24, but where the shafts 2 and 3 are located a considerable distance apart I prefer to use a pair of rods 23, as shown and described herein.

When the members 11 are shifted upon the shafts 2 and 3 they move at the same speed and relatively the same distance toward and away from the corresponding conical members 10, and for this reason the belt 16 always maintains its proper position on the two expansible pulleys, and the center of said belt occupies a straight line at right angles to the shafts 2 and 3. Thus when the parts 11 are shifted there is no lateral shifting movement of the ends of the belt tending to throw said belt out of a straight line between the expansible pulleys.

After the parts have been adjusted so as to impart the desired speed of rotation to the driven shaft, and to the machine to be operated, and it is desired to tighten the belt 16, such result can be accomplished by manipulating either one of the nuts 18 in such a manner as to move the corresponding member 10 a slight distance toward the corresponding member 11. This movement is necessarily very slight, and it will not materiall affect the velocity of the transmitted rotary motion.

A variable speed mechanism of my improved construction is comparatively simple, is adapted for a variety of uses, can be easily and quickly adjusted, and owing to the peculiar construction of the expansible pulleys the liability of slippage of the belt traveling on said pulleys is reduced to a minimum.

It will be readily understood that minor changes in the form, size and construction of the various parts of my improved apparatus can be readily made and substituted for those herein shown and described without departing from the spirit of my invention.

I claim:

1. In an apparatus of the class described, the combination with a shaft, of an expansible pulley comprising a pair of conical members, one of which is mounted to rotate with and slide upon the shaft, means on the shaft for adjusting the opposite conical member toward the first mentioned conical member, both of which conical members are provided with radially-arranged grooves in their faces, which grooves are T-shaped in cross section, a series of radially-arranged plates between the pair of members, the ends of which plates are T-shaped and mounted for sliding movement in the T-shaped grooves, and a segment fixed to each plate, the ends of all of which segments are beveled and bear against the corresponding beveled faces of the conical members.

2. In a machine of the class described, a pair of shafts, portions of which are threaded, a pair of conical members on each shaft, certain of which members are mounted to rotate and slide upon the shafts, means located on the shafts for adjusting the opposite conical members toward the sliding and rotating members, all of which conical members are provided with radially-arranged grooves in their beveled faces, which grooves are T-shaped in cross section, a series of radially-arranged plates arranged between each pair of conical members, the ends of which plates are T-shaped and are arranged to slide in the T-shaped grooves in the conical members, segmental blocks fixed to the radially-arranged plates, the ends of which segmental blocks are beveled, and bear upon the inclined faces of the conical members, a belt connecting the two sets of segmental blocks, and means for simultaneously imparting uniform movement to the sliding and rotating conical members, whereby the belt is maintained in a straight line position between the two pulleys formed by the conical members and segmental blocks.

3. In an apparatus of the class described, the combination of a shaft, a pair of conical members mounted to slide upon and rotate with said shaft, means for moving one of the conical members toward or away from the other, a nut mounted on a threaded portion of the shaft, and bearing against the rear side of the opposite conical member for adjusting the position thereof, with respect to the other conical member, which conical members are provided with grooves in their inclined faces, which grooves are T-shaped in cross section, plates having T-shaped ends mounted for sliding movement in said grooves, and segmental blocks fixed to the radially-arranged plates.

In testimony whereof I hereunto affix my signature in the presence of two witnesses, this 7th day of December, 1910.

JACOB RANZ.

Witnesses:
 M. P. SMITH,
 B. S. REID.

Copies of this patent may be obtained for five cents each, by addressing the "Commissioner of Patents, Washington, D. C."